United States Patent [19]

Leonardi

[11] Patent Number: 4,930,060
[45] Date of Patent: May 29, 1990

[54] SWITCH-MODE POWER SUPPLY

[75] Inventor: Giovanni M. Leonardi, Zurich, Switzerland

[73] Assignee: RCA Licensing Corporation, Princeton, N.J.

[21] Appl. No.: 270,877

[22] Filed: Nov. 14, 1988

[30] Foreign Application Priority Data

Oct. 3, 1988 [GB] United Kingdom ............... 8805759

[51] Int. Cl.$^5$ ........................................ H02M 3/335
[52] U.S. Cl. ...................................... 363/21; 363/56; 363/97
[58] Field of Search ................. 363/20, 21, 56, 79, 363/97, 131

[56] References Cited

U.S. PATENT DOCUMENTS

| | | | |
|---|---|---|---|
| 3,590,362 | 6/1971 | Kakalec | 363/22 |
| 3,818,314 | 6/1974 | Bishop et al. | 363/23 |
| 4,024,577 | 5/1977 | Diethelm | 358/190 |
| 4,135,233 | 1/1979 | Seiersen | 363/21 |
| 4,499,530 | 2/1985 | Onda et al. | 363/21 X |
| 4,595,977 | 6/1986 | von der Ohe | 363/56 |
| 4,648,016 | 3/1987 | Peruth et al. | 363/21 |
| 4,649,464 | 3/1987 | Shono | 363/97 X |
| 4,683,528 | 7/1987 | Snow et al. | 363/21 |
| 4,692,852 | 9/1987 | Hoover | 363/131 X |
| 4,692,853 | 9/1987 | de Sartre et al. | 363/97 X |
| 4,716,510 | 12/1987 | Pace et al. | 363/49 |
| 4,754,386 | 6/1986 | De Weerd | 363/56 X |
| 4,763,238 | 8/1988 | Maige | 363/56 X |
| 4,766,528 | 8/1988 | Marinus | 363/21 |

OTHER PUBLICATIONS

Siemens Co., "Switched-Mode Power Supplies Using the TDA 4600", 2/81, pp. 6-15.
A Schematic Diagram of a Power Supply Module AZB 5000 of a Television Receiver Power Supply published by Siemens Co., 7/74.

Primary Examiner—Patrick R. Salce
Assistant Examiner—Kristine Peckman
Attorney, Agent, or Firm—Joseph S. Tripoli; Joseph J. Laks; Sammy S. Henig

[57] ABSTRACT

An input supply voltage is coupled via a primary winding of a flyback transformer to a collector of a chopper transistor switch that operates at a given frequency. During a portion of each period when the chopper transistor switch is conductive, a second switch applies a short-circuit across a secondary winding of the transformer at a controllable instant that causes the emitter current of the chopper transistor switch to increase at a significantly higher rate. When the emitter current exceeds a predetermined threshold level, a one-shot arrangement is triggered. Consequently, a pulse is produced that turns off the chopper transistor switch and that maintains it nonconductive for the duration of the pulse. A flyback pulse produced in a winding of the transformer is rectified to produce a DC output supply voltage. The length of the interval when the chopper transistor switch is conductive is controlled by the second switch in accordance with the level of the output supply voltage in a negative feedback manner for regulating the output supply voltage.

26 Claims, 8 Drawing Sheets

SWITCH-MODE POWER SUPPLY

The invention relates to switch-mode power supplies.

Some television receivers have signal terminals for receiving, for example, external video input signals such as R, G and B input signals, that are to be developed relative to the common conductor of the receiver. Such signal terminals and the receiver common conductor may be coupled to corresponding signal terminals and common conductors of external devices, such as, for example, a VCR or a teletext decoder.

To simplify the coupling of signals between the external devices and the television receiver, the common conductors of the receiver and of the external devices are connected together so that all are at the same potential. The signal lines of each external device are coupled to the corresponding signal terminals of the receiver. In such an arrangement, the common conductor of each device, such as of the television receiver, may be held "floating", or conductively isolated, relative to the corresponding AC mains supply source that energizes the device. When the common conductor is held floating, a user touching a terminal that is at the potential of the common conductor will not suffer an electrical shock.

Therefore, it may be desirable to isolate the common conductor, or ground, of, for example, the television receiver, from the potentials of the terminals of the AC mains supply source that provide power to the television receiver. Such isolation is typically achieved by a transformer. The isolated common conductor is sometimes referred to as "cold" ground conductor.

In a typical switch mode power supply (SMPS) of a television receiver, for example, the AC mains supply voltage is coupled directly to a bridge rectifier for producing an unregulated direct current (DC) input supply voltage that is, for example, referenced to a common conductor, referred to as "hot" ground, and that is conductively isolated from the cold ground conductor. A pulse width modulator controls the duty cycle of a chopper transistor switch that applies the unregulated supply voltage across a primary winding of an isolating flyback transformer. A flyback voltage at a frequency that is determined by the modulator is developed at a secondary winding of the transformer and is rectified to produce a DC output supply voltage such as a voltage B+ that energizes a horizontal deflection circuit of the television receiver. The primary winding of the flyback transformer is, for example, conductively coupled to the hot ground conductor. The secondary winding of the flyback transformer and voltage B+ may be conductively isolated from the hot ground conductor by the hot-cold barrier formed by the transformer.

In some prior art circuits, voltage B+ is sensed by sensing a voltage developed at a separate winding of the flyback transformer. Disadvantageously, such sensed voltage may not track variation of voltage B+ sufficiently. In order to provide better regulation of voltage B+, it may be desirable to sense voltage B+ directly at a terminal where it is produced.

In a SMPS embodying an aspect of the invention, a feedback timing control signal is produced in accordance with the level of voltage B+, that are both referenced to the cold ground conductor. The timing control signal is applied to the chopper transistor switch that is conductively coupled to the hot ground conductor to effectuate pulse width modulation of the conduction duty cycle of the chopper transistor switch.

It may be desirable to apply such timing control signal without using an additional isolation transformer.

A switch mode power supply embodying another aspect of the invention includes a source of an input supply voltage and a transformer having first and second windings. A controllable switch has a main current conducting terminal that is coupled to the first winding and to the source of the input supply voltage. The controllable switch is switched by a periodic first control signal for generating a first switching current in the first winding that stores magnetic energy in the transformer. The first switching current is used for producing an output supply voltage that is coupled to a load. A current sampling, first impedance is coupled in a current path that includes the first winding for conducting at least a portion of the first switching current in the first impedance. A current sampling signal is developed in the first impedance that is indicative of a level of the first switching current when the switching transistor is conductive. The first control signal switches the controllable switch into nonconduction when the first switching current exceeds a predetermined level in accordance with the current sampling signal. A low impedance is applied to the second winding after a first conduction interval of the controllable switch has elapsed, to cause the first switching current to exceed the predetermined level. The first conduction interval is varied in accordance with the output supply voltage such that a duty cycle of the controllable switch varies in a negative feedback manner for regulating the output supply voltage.

The first switching current may be coupled via a third winding of the transformer to produce the output supply voltage from the current in the third winding. The first winding may be electrically nonisolated from the input supply voltage with respect to electrical shock hazard; whereas the second and third windings may be electrically isolated from the input supply voltage. Advantageously, the transformer provides the aforementioned required electrical isolation for coupling the first switching current via the third winding across an isolation barrier in one direction and for coupling control information via the second winding across the isolation barrier in the opposite direction.

Figure 1A:
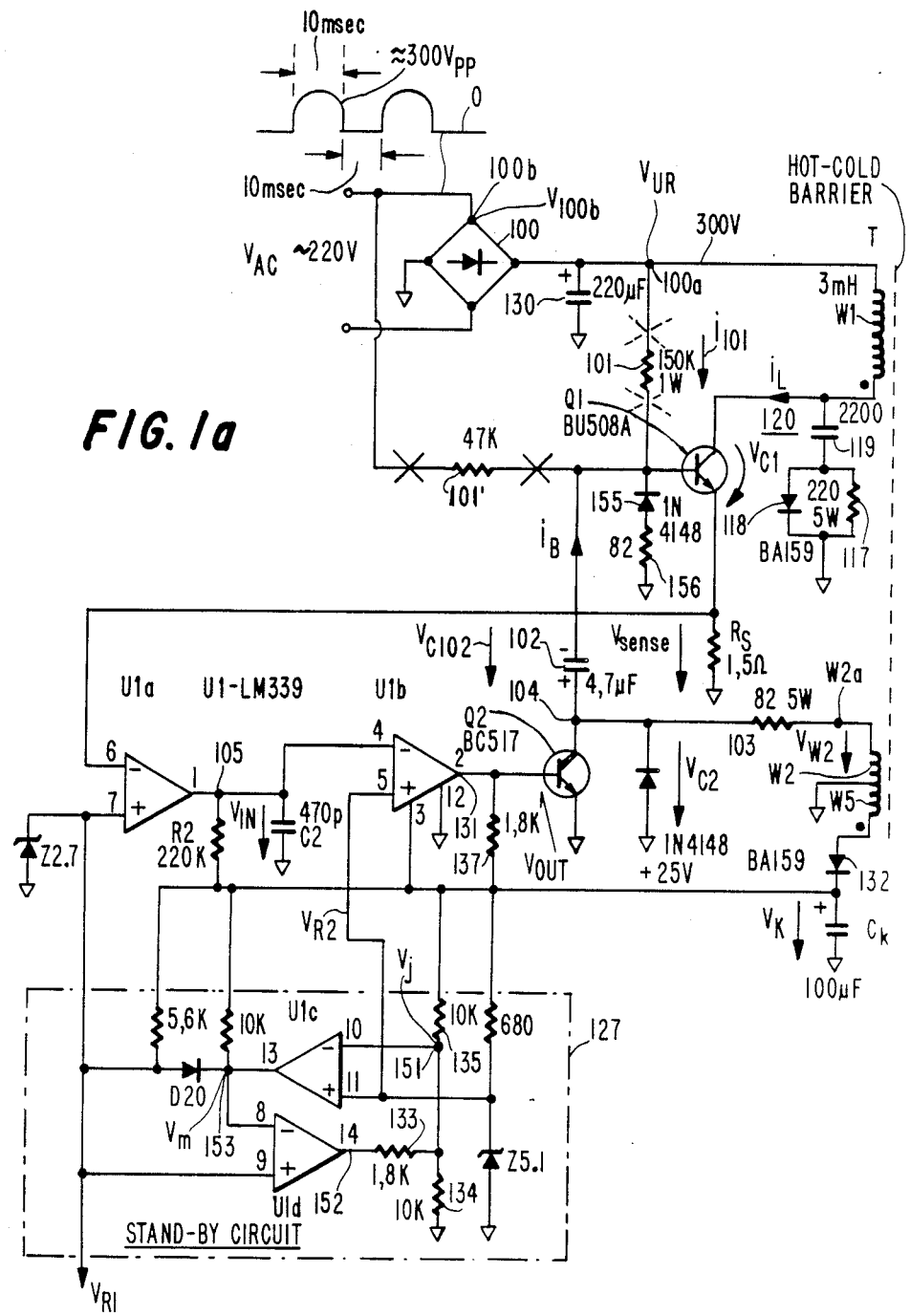
FIGS. 1a and 1b illustrates a power supply embodying an aspect of the invention.
Figure 3:
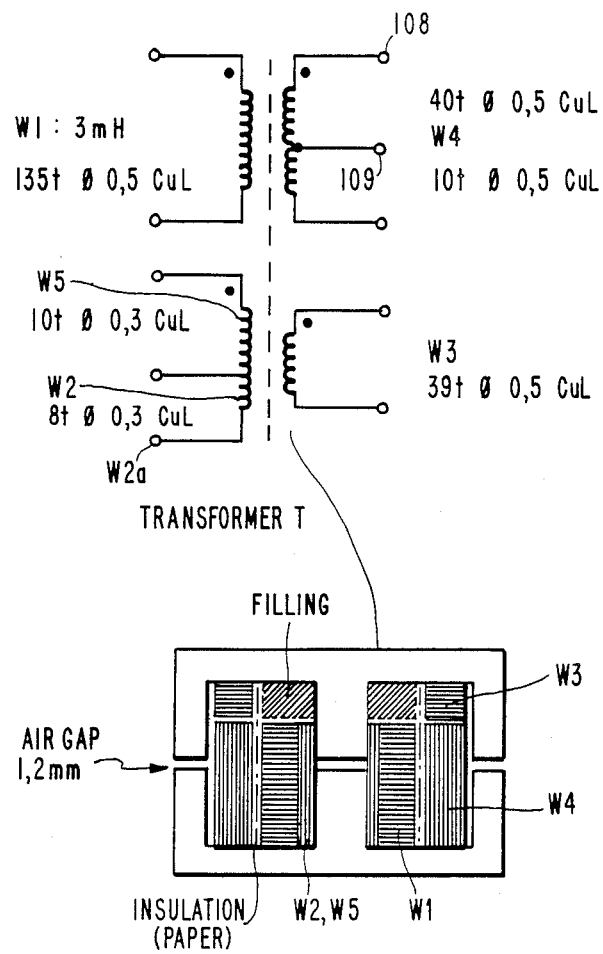
FIG. 3 illustrates an isolation transformer used in the circuit of FIGS. 1a and 1b.
Figure 1B:
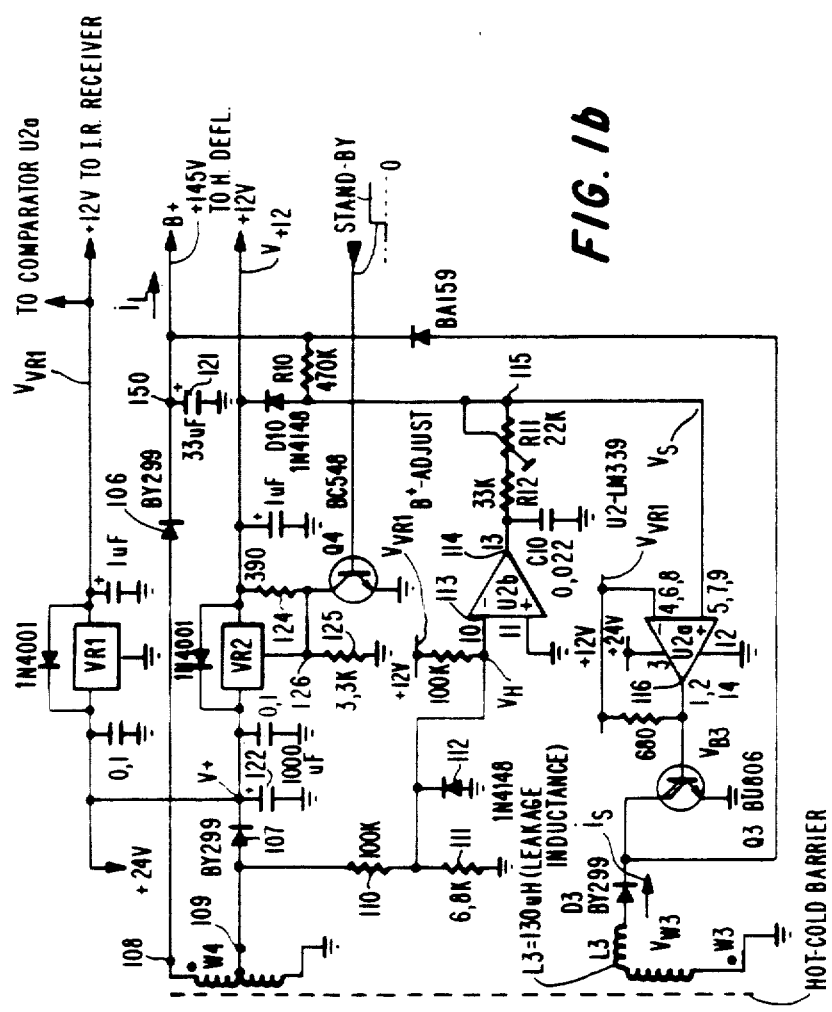

FIGS. 1a and 1b illustrate a switch-mode power supply (SMPS), embodying an aspect of the invention. The SMPS produces an output supply voltage B+ at +145 volts that is used for energizing, for example, a deflection circuit of a television receiver, not shown, and an output supply voltage V+ at +24 volts that are both regulated. A mains supply voltage $V_{AC}$ is rectified in a bridge rectifier 100 to produce an unregulated voltage $V_{UR}$. A primary winding W1 of a flyback transformer T is coupled between a terminal 100a, where voltage $V_{UR}$, is developed, and a collector electrode of a power switching transistor Q1. Transformer T is constructed in the manner shown in FIG. 3. Similar symbols and numerals in FIGS. 1a and 1b and 3 indicate similar items or functions.

The emitter of transistor Q1 of FIG. 1a is coupled to a common conductor, referred to herein as "hot" ground, via an emitter current sampling resistor $R_s$ for developing a voltage $V_{sense}$ across resistor $R_s$ that is proportional to a collector current $i_c$ of transistor Q1. The base of transistor Q1 is coupled via a coupling capacitor 102 to a terminal 104 where a switching signal $V_{c2}$ is produced. Signal $V_{c2}$ produces a switching operation in transistor Q1. Terminal 104 is coupled via a resistor 103 to a terminal W2a of a secondary winding W2 of transformer T.

Figure 2:
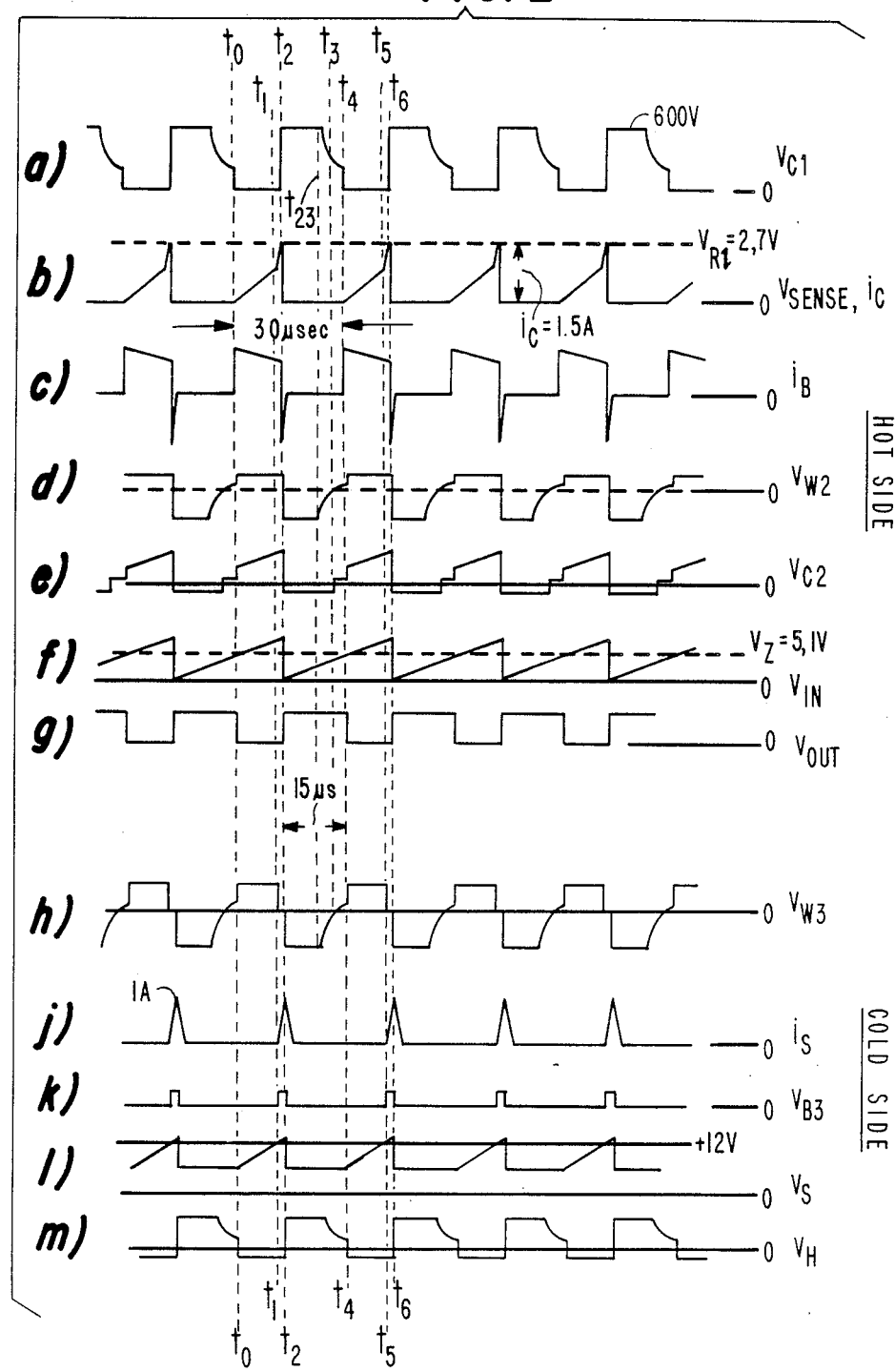
FIG. 2 illustrate waveforms useful for explaining the normal operation of the circuit of FIGS. 1a and 1b.

FIG. 2 illustrate waveforms useful for explaining the normal steady state operation of the SMPS of FIGS. 1a and 1b. Similar symbols and numerals in FIGS. 1a and 1b and 2 indicate similar items or functions.

During, for example, interval $t_0$–$t_2$ of FIG. 2a of a corresponding cycle, a voltage $V_{W2}$ of FIG. 2d developed in winding W2 of FIG. 1a is positive relative to the hot ground and produces a current $i_B$ in the direction of the arrow that flows in the base of transistor Q1. Current $i_B$ develops a voltage $V_{c102}$ in capacitor 102 in the polarity shown. Current $i_B$ of FIG. 2c provides the base current that maintains transistor Q1 of FIG. 1a conductive during interval $t_0$–$t_2$ of FIG. 2a. Consequently, collector current $i_c$ of FIG. 1a is upramping, as shown in FIG. 2b during interval $t_0$–$t_2$, that causes an inductive energy to be stored in transformer T of FIGS. 1a and 1b. As described later on, at time $t_2$ of FIG. 2a, transistor Q1 of FIG. 1a becomes nonconductive.

After transistor Q1 becomes nonconductive, the inductive energy stored in winding W1 is transferred by a transformer, or flyback action to a secondary winding W4 of transformer T. Corresponding flyback pulses developed in corresponding terminals 108 and 109 of winding W4 are rectified by diodes 106 and 107, respectively, and filtered in capacitors 121 and 122, respectively, for producing DC voltages B+ and V+, respectively, that are referenced to a second common conductor, referred to herein as "cold" ground. The cold ground is conductively isolated from the hot ground.

Terminal 109 is coupled through a voltage divider formed by resistors 110 and 111 to an inverting input terminal 113 of a comparator U2b. When transistor Q1 of FIG. 1a is conductive, the voltage at terminal 109 produced by the transformer action is negative, causing a protection diode 112 that is coupled to terminal 113 to conduct and to clamp a signal $V_H$ developed at terminal 113 to a negative value during interval $t_0$–$t_2$ of FIG. 2m.

Three resistors, R10, R11 and R12 of FIG. 1b, that are coupled in series between a terminal 150 where voltage B+ is developed and an output terminal 114 of comparator U2b, cause a capacitor C10, coupled between terminal 114 and the cold ground, to charge. Consequently, when signal $V_H$ is negative, an upramping portion of a sawtooth signal $V_s$ is produced. Signal $V_s$ that is produced at a terminal 115 between resistors R10 and R11 has a waveform that is shown in FIG. 2l, during interval $t_0$–$t_2$, for example. Prior to interval $t_0$–$t_2$, capacitor C10 of FIG. 1b is completely discharged, resulting in a flat portion of signal $V_s$ of FIG. 2l at a level that is smaller than +12 V. The level of the flat portion is determined by the ratio between the sum of resistors R11 and R12 of FIG. 1b and between resistor R10.

Sawtooth signal $V_s$ is coupled to a noninverting input terminal of a comparator U2a. A level of +12 volts is coupled to an inverting input terminal of comparator U2a. An output terminal 116 of comparator U2a, where a pulse signal $V_{B3}$ of FIG. 2k is developed, is coupled to a base electrode of a switching transistor Q3 of FIG. 1b. The collector of transistor Q3 of FIG. 1b is coupled via a protection diode D3 and via a current limiting inductor L3 to a secondary winding W3 of transformer T. Transistor Q3 becomes conductive at an instant that occurs during a portion of the conduction interval of transistor Q1 after sawtooth signal $V_s$ becomes larger than the +12 volt level, such as, for example, during interval $t_1$–$t_2$ of FIG. 2k.

When conductive, transistor Q3 forms, with diode D3 and inductor L3, a series arrangement that is coupled across winding W3 and that operates substantially as a low impedance across winding W3. Inductor L3 limits the peak amplitude of a short circuit current $i_s$ of FIG. 2j. The resulting low impedance is reflected by the transformer action as a low impedance across winding W1 of FIG. 1a. The result is that collector current $i_c$ of transistor Q1 increases during interval $t_1$–$t_2$ of FIG. 2b at a substantially faster rate than during interval $t_0$–$t_1$. Consequently, voltage $V_{sense}$ of FIG. 1a that is proportional to current $i_c$ becomes equal, shortly after time $t_1$ of FIG. 2b, to a reference voltage $V_{R1}$ of FIG. 1a developed across a zener diode Z2.7.

Voltages $V_{sense}$ and $V_{R1}$ are coupled to and compared in a comparator U1a having an output transistor switch, not shown, that is coupled through an output terminal 105 across a capacitor C2. When, at time $t_2$ of FIG. 2b, voltage $V_{sense}$ becomes equal to volta $V_{R1}$, capacitor C2 of FIG. 1a is immediately discharged and a sawtooth signal $V_{in}$, developed in capacitor C2, becomes zero, as shown in FIG. 2f. During the remainder of each cycle, such as during interval $t_2$–$t_6$, sawtooth signal $V_{in}$ is upramping at a rate determined by a resistor R2 of FIG. 1a and by capacitor C2. Signal $V_{in}$ is coupled to an inverting input terminal of a comparator U1b. A reference level $V_{R2}$, developed across a zener diode Z5.1, is coupled to a noninverting input terminal of comparator U1b.

When, at time $t_2$ of FIG. 2f, signal $V_{in}$ becomes zero, an output signal $V_{out}$ of FIG. 2g, developed at an output terminal of comparator U1b and coupled to the base of switching transistor Q2 turns on transistor Q2. When, at time $t_2$ of FIG. 2e, transistor Q2 of FIG. 1a is turned-on, transistor Q2, couples terminal 104 of capacitor 102 to the hot ground. The other terminal of capacitor 102 that is coupled to the base of transistor Q1 is at a level that is negative relative to that at terminal 104. Therefore, the base charge in transistor Q1 that maintains transistor Q1 conductive prior to time $t_2$ of FIG. 2a is fastly swept out, causing transistor Q1 of FIG. 1a to become immediately nonconductive.

Signal $V_{out}$ that is controlled by sawtooth signal $V_{in}$ maintains transistor Q2 conductive and transistor Q1 nonconductive during interval $t_2$–$t_4$ of FIG. 2g. Signal $V_{out}$ changes state to attain a level of zero volts at time $t_4$ when upramping signal $V_{in}$ of FIG. 2l becomes larger than level $V_{R2}$, thus a one-shot operation is obtained. Transistor Q2 is maintained conductive and transistor Q1 is maintained nonconductive during, for example, interval $t_2$–$t_4$ of FIG. 2a having a length that is the same in each cycle.

During a portion of, for example, interval $t_2$–$t_4$, the corresponding positive flyback pulses at terminals 108 and 109 of secondary winding W4 produce current that maintain diodes 106 and 107 conductive and cause filter capacitors 121 and 122, respectively, to charge. The charge stored in capacitor 121, for example, replenishes a charge removed by a load current $i_L$ that flows through, for example, terminal 150, and is proportional to the length of interval $t_0$–$t_2$ of FIG. 2a when transistor Q1 of FIG. 1a was maintained conductive. The length of interval $t_0$–$t_2$ of FIG. 2a is, in turn, controlled by signal $V_{B3}$. Thus, voltage B+, for example, is regulated by signal $V_{B3}$ that controls the duty cycle of transistor Q1.

A positive voltage at terminal 109 of FIG. 1b that occurs during the nonconduction interval of transistor Q1 causes signal $V_H$ at terminal 113 of comparator U2b to be positive, as shown during interval $t_2$–$t_4$ of FIG. 2m. The result is that capacitor C10 of FIG. 1b is immediately discharged and sawtooth signal $V_s$ is maintained at the constant level that is lower than +12 volts during, for example, interval $t_2$–$t_4$ of FIG. 2l, in preparation for the following interval $t_4$–$t_6$ of FIG. 2a when transistor Q1 of FIG. 1a again becomes conductive.

Diode 106, for example, that is used for producing voltage B+, remains conductive until a time $t_{23}$ of FIG. 2a. During interval $t_2$–$t_{23}$, transistor Q1 collector voltage $V_{c1}$ is at a constant positive level of +600 V that is determined by voltage $V_{UR}$, by voltage B+ of FIG. 1 and by the turn ratio of transformer T.

During interval $t_{23}$–$t_4$ of FIG. 2a, voltage $V_{c1}$ varies in a reosonant manner due to the operation of an arrangement 120 of FIG. 1a forming a resonant circuit with the inductance of winding W1. Arrangement 120 includes a capacitor 119 of FIG. 1a that is coupled in series with a parallel arrangement of a damping resistor 117 and a diode 118 to form arrangement 120. Arrangement 120 is coupled between the collector of transistor Q1 and the hot ground. Diode 118 causes the voltage across capacitor 119 to be equal to voltage $V_{cl}$, during interval $t_2$–$t_{23}$ of FIG. 2a.

During interval $t_{23}$–$t_4$, diodes 106 and 107 of FIG. 1b are nonconductive and collector voltage $V_{cl}$ varies as a result of a resonant ringing current that is produced in winding W1, capacitor 119 and resistor 117. The resonant ringing current causes voltage $V_{W2}$, that is developed across winding W2 of transformer T and that is negative until time $t_3$ of FIG. 2d, to become increasingly more positive after time $t_3$ in a resonant manner.

At time $t_4$ of FIG. 2g, signal $V_{out}$ at the base of transistor Q2 of FIG. 1a becomes zero as a result of the one-shot operation that was described before, causing transistor Q2 to become nonconductive. After becoming nonconductive, transistor Q2 enables the coupling of positive voltage $V_{W2}$ to the base of transistor Q1. Positive voltage $V_{W2}$ that is coupled via resistor 103 and capacitor 102 to the base of transistor Q1 produces current $i_B$ that causes transistor Q1 of FIG. 1a to be turned on. The values of capacitor 119 and resistor 117 are selected so as to insure that voltage $V_{W2}$ is sufficiently positive to turn on transistor Q1 at time $t_4$ of FIG. 2d when signal $V_{out}$ of FIG. 2g becomes zero. Transistor Q1 of FIG. 1a remains conductive until time $t_6$ of FIG. 2a that is determined by pulse $V_{B3}$ of FIG. 2k, in the manner described before with respect to interval $t_0$–$t_2$.

After time $t_4$ of FIG. 2a, that is analogous to time $t_0$ of the immediately preceding cycle, capacitor C10 of FIG. 1b is charged in a sawtooth manner, as described before with respect to interval $t_0$–$t_1$ of FIG. 2a. The DC offset voltage of signal $V_s$ is proportional to voltage B+ and may be adjustable by adjusting resistor R11. Thus, pulse signal $V_{B3}$ at the base of transistor Q3 of FIG. 1b having a leading edge that occurs at time $t_5$, for example, of FIG. 2k, occurs after interval $t_4$–$t_5$ of FIG. 2l has elapsed. The length of interval $t_4$–$t_5$, representing the conduction time of transistor Q1 of FIG. 1a, is proportional to voltage B+.

An increase in voltage B+, for example, causes the DC offset of signal $V_s$ to increase, hence, transistor Q3 turns on earlier in a given cycle. As described before, when transistor Q3 is turned on by the pulse of signal $V_{B3}$, collector current $i_c$ of transistor Q1 increases rapidly that causes transistor Q2 to turn on and that, in turn, causes transistor Q1 to turn off shortly afterward Thus, the length of interval $t_0$–$t_2$ or $t_4$–$t_6$, occuring when transistor Q1 is conductive, decreases when voltage B+ increases. The result is that a smaller amount of magnetic energy is available for producing the current that charges, for example, filter capacitor 121 of FIG. 1b across which voltage B+ is developed. On the other hand, a decrease in voltage B+ will cause transistors Q2 and Q3 to turn on and transitor Q1 to turn off later in the given cycle. Thus, a change in voltage B+ is counteracted in a negative feedback loop manner by advancing or delaying the instant, in the given cycle, when transistor Q3 is turned on and when transistor Q1 is turned off as controlled by voltage B+. The gain of such negative feedback loop is determined by the value of capacitor C10 and may be raised or lowered by selecting the value of capacitor C10.

A first portion of the SMPS of FIGS. 1a and 1b that includes, for example, winding W4, that includes the respective terminals where voltage B+ and signal $V_{B3}$ are developed and that includes winding W3, is conductively coupled to the cold ground. On the other hand, a second portion of the SMPS that includes, for example, transistor Q1 and winding W1 are conductively coupled to the hot ground. Transformer T provides a hot-cold barrier that conductively isolates the first portion of the SMPS from the second portion.

In accordance with an aspect of the invention, timing signal $V_{B3}$ that is referenced to the cold ground is applied via winding W3 of flyback transformer T to the base electrode of transistor Q1 that is conductively coupled to the hot ground. Thus transformer T maintains the hot ground conductively isolated from the cold ground. Signal $V_{B3}$ controls the turn-off instant of transistor Q1 in accordance with the level of voltage B+, as explained before.

Energy is transfered in transformer T across the hot-cold barrier from the second portion of the SMPS that is conductively coupled to the hot ground, that includes for example, winding W1, to the first portion of the SMPS that is conductively coupled to the cold ground and that includes, for example, winding W4. Such energy transfer occurs in a direction, across the hot-cold barrier, that is opposite to the direction in which signal $V_{B3}$ is coupled across such hot-cold barrier. Thus, transformer T is used for passing supply current in one direction across the hot-cold barrier, that is from winding W1 to winding W4, and for applying timing signal $V_{B3}$ to control the switching timings in transistor Q1, in the opposite direction across the hot-cold barrier. Therefore, advantageously, there is no need for an additional isolation transformer for coupling timing signal $V_{B3}$ across the hot-cold barrier from the first portion of the SMPS that is conductively coupled to the cold ground, where control signal $V_{B3}$ is generated, to the second portion of the SMPS that is conductively coupled to the hot ground, where the control operation is actually performed. Advantageously, timing signal $V_{B3}$ is generated by sensing the level of voltage B+ at terminal 150 where voltage B+ is actually developed.

A series pass regulator VR2 that is energized by voltage V+ produces a +12 volt regulated voltage V+12. Regulated voltage V+12 is produced as a function of a voltage produced at a junction terminal 126 between resistors 124 and 125. Resistor 124 and 125 form a series arrangement that is coupled between voltage V+12 and the cold ground.

A supply voltage $V_K$ is produced by rectifying, using a diode 132, a flyback voltage developed in a winding W5. Voltage $V_K$ that is referenced to the hot ground is used for energizing, for example, comparators U1c and U1d of control circuit 127. Voltage $V_K$, that is filtered in a capacitor $C_K$, is coupled through a resistive voltage divider to an inverting input terminal 151 of a comparator U1c for developing at terminal 151 a control voltage $V_j$. The resistive voltage divider includes a resistor 135 coupled in series with a resistor 134. A resistor 133 has a first terminal that is coupled to junction terminal 151, between resistors 135 and 134, and a second terminal that is coupled to an output terminal 152 of a comparator U1d.

Voltage $V_{R2}$ is coupled to the noninverting input terminal of comparator U1c. An output terminal 153 of comparator U1c, where a voltage $V_m$ is developed, is coupled to an inverting input terminal of comparator U1d. Reference voltage $V_{R1}$ is coupled to a noninverting input terminal of comparator U1d.

FIGS. 4a–4h illustrate waveforms useful for explaining a transition of the SMPS of FIGS. 1a and 1b from normal to standby operation. FIGS. 5a–5h illustrate the corresponding waveforms useful for explaining a transition back to normal operation. Similar figures and numerals in FIGS. 1a, 1b, 2a–2m, 4a–4h and 5a–5h indicate similar items or functions.

During normal operation, comparators U1c and U1d of FIG. 1a operate as a latch that maintains the voltage at terminal 152 at zero volts, causing voltage $V_j$ to be smaller than voltage $V_{R2}$. Therefore, comparator U1c generates voltage $V_m$ at a level that is higher than voltage $V_{R1}$ for maintaining a diode D20, coupled to the noninverting input terminal of comparator U1a, nonconductive.

Figure 4:
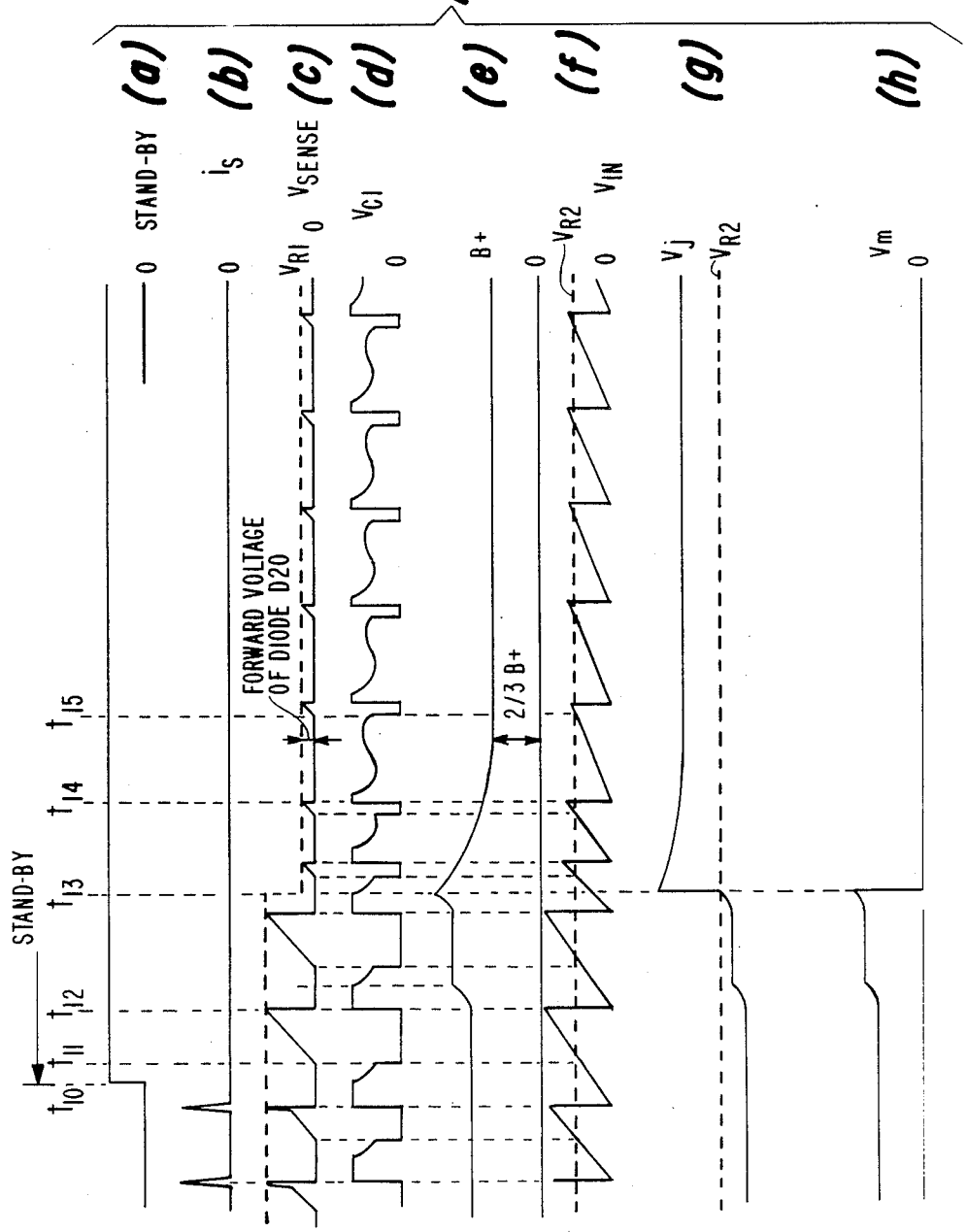
FIG. 4 illustrates waveform useful for explaining a transition from normal to standby operation of the power supply of FIGS. 1a and 1b.

Standby operation is initiated when a transistor Q4 of FIG. 1b, operating as a switch and coupled across resistor 125, becomes conductive, as shown at time $t_{10}$ of FIG. 4a. Consequently, voltage V+12 of FIG. 1b becomes zero. The result is that the horizontal oscillator, not shown, ceases operating immediately and standby operation begins.

The reduction of voltage V+12 to zero volts causes voltage $V_s$, at the noninverting input terminal of comparator U2a, to be clamped to the forward voltage of a diode D10. However, a voltage $V_{VR1}$ at the inverting input terminal of comparator U2a that is produced in a voltage regulator VR1 is maintained equal to approximately +12 V, during both normal and standby operations. Therefore, transistor Q3 remains continuously in a nonconductive state; consequently, transistor Q1 forms with transformer T a free-running blocking oscillator that is no longer controlled in a negative feedback loop manner. Therefore, the duty cycle of transistor Q1 initially increases after transistor Q4 becomes conductive. The load at terminal 150 draws substantially less current during standby. Therefore, voltages $V_K$, B+ and $V_j$ initially increase after the transition to the conductive state in transistor Q4, as shown in FIGS. 4e and 4g during interval $t_{12}$–$t_{13}$.

At time $t_{13}$ of FIG. 4g, voltage $V_j$ becomes equal to voltage $V_{R2}$, causing comparator U1c of FIG. 1a to produce output voltage $V_m$ at zero volts, as shown in FIG. 4h. Clamping diode D20 of FIG. 1a, that, during normal operation, is back biased by voltage $V_m$, becomes conductive at time $t_{13}$ of FIG. 4h. After time $t_{13}$ of FIG. 4h, an anode of diode D20 of FIG. 1a that is coupled to the noninverting input terminal of comparator U1a clamps voltage $V_{R1}$ at the noninverting input terminal of comparator U1d to the forward voltage of diode D20. Thus voltage $V_{R1}$, during standby, is substantially lower than during normal operation. Consequently, transistor Q1 will be turned-off, during each cycle, when a peak level of collector current $i_c$ is substantially lower than during normal operation, as shown by the waveform of voltage $V_{sense}$ of FIG. 4c. Hence, the stored energy in winding W1 of FIG. 1a is substantially reduced during the conduction time of transistor Q1. The result is that, during standby, voltages B+ and $V_K$ will ultimately decrease relative to their respective values during normal operation.

The decrease in voltage $V_K$ will cause the rate of change of upramping signal $V_{in}$ of FIG. 2f to decrease as well. Therefore, the ratio of conduction time to nonconduction time, or duty cycle, of transistor Q1 will further decrease. The result is that voltages B+ and $V_K$ will even further decrease relative to their values during normal operation. In a typical loading condition, voltage B+ drops, during standby, to about, for example, $\frac{2}{3}$ of its normal operation level.

A low level voltage B+ is desirable during start-up for reducing the stress on the horizontal deflection switch, not shown, during a transition from standby to normal operation to avoid the risk of a secondary breakdown in the deflection transistor. In contrast, in some prior art SMPS that utilizes, for example, an integrated circuit TDA4600, voltage B+ may increase from a normal operation level of +145 V to a standby level of +190 V.

After time $t_{13}$ of FIG. 4h, comparator U1d of FIG. 1a, having input terminals that are coupled across conductive diode D20, decouples resistor 133 from the resistive voltage divider. Therefore, voltage $V_j$ of FIG. 4g becomes immediately higher than voltage $V_{R2}$. The result is that comparator U1c of FIG. 1a maintains voltage $V_m$ of FIG. 4h at zero volts throughout standby. Consequently, comparators U1c and U1d of FIG. 1a will remain latched to their respective states throughout standby operation even though, as described before, voltage $V_K$, ultimately becomes smaller, during standby, than during normal operation.

Figure 5:
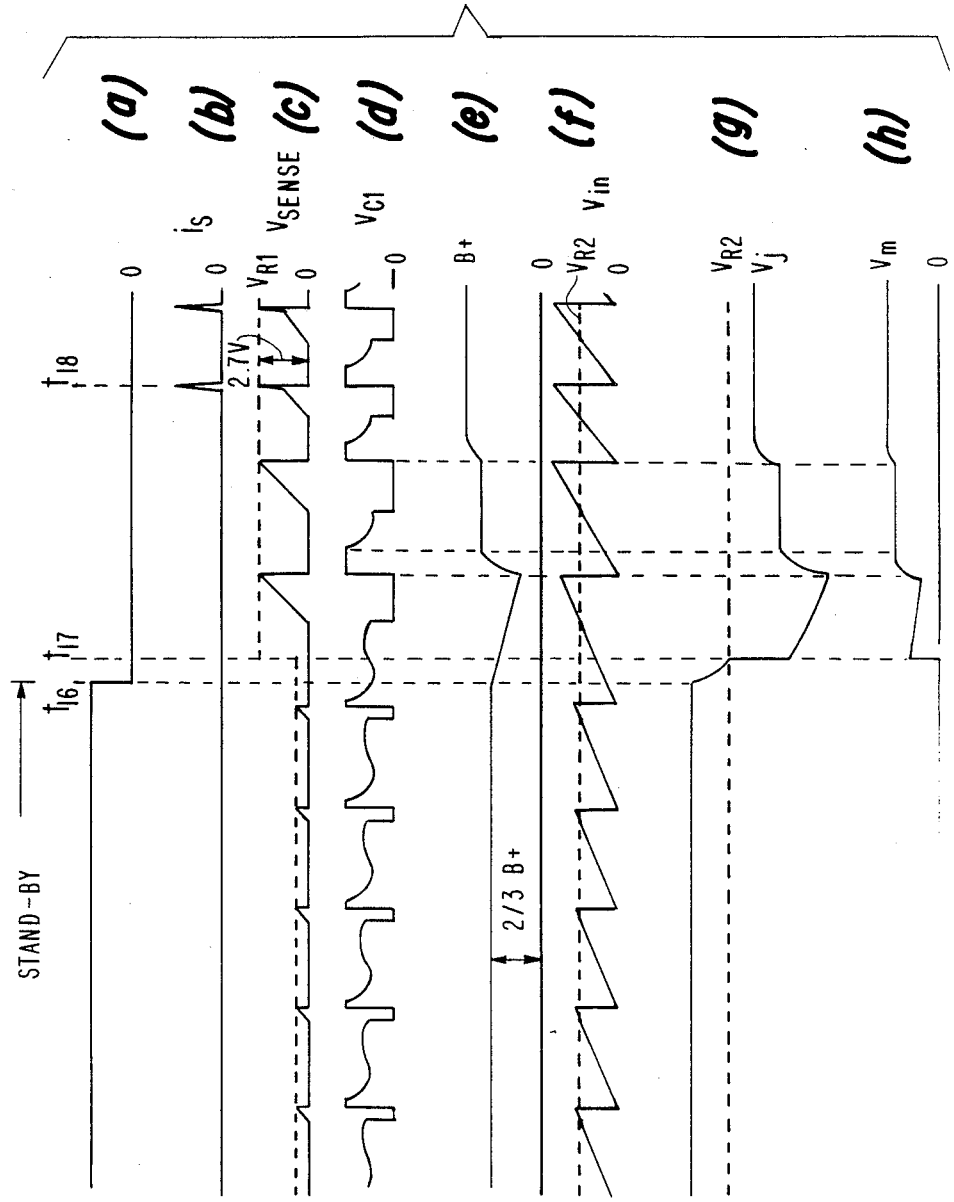
FIG. 5 illustrates waveforms useful for explaining a transition from standby to normal operation of the power supply of FIGS. 1a and 1b.

Immediately after normal operation is initiated by the operation of transistor Q4, as shown at time $t_{16}$ of FIG. 5a, voltages B+ of FIG. 5e and voltage $V_j$ of FIG. 5g decrease in a down ramping manner. The decrease in voltage B+ and $V_j$ occurs due to the sudden loading of, for example, voltage B+ by the horizontal deflection transistor, not shown, that begins switching. When, at time $t_{17}$ of FIG. 5g, voltage $V_j$ becomes smaller than voltage $V_{R2}$, comparators U1c and U1d of standby control circuit 127 of FIG. 1 reverse their respective states. Consequently, diode D20 of FIG. 1a becomes again back biased and voltage $V_{R1}$ returns to its normal level of +2.7 V. Subsequently, transistor Q3 is turned on at time $t_{18}$ of FIG. 5b, causing the resumption of the feedback operation in the SMPS of FIGS. 1a and 1b.

Figure 6:
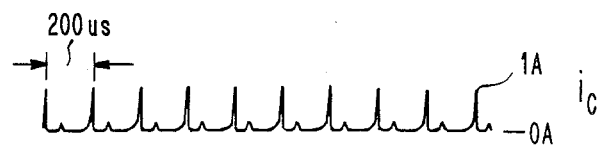
FIG. 6 illustrates waveforms of the circuit of FIGS. 1a and 1b during an overload condition.

If a fault condition occurs in the deflection circuit, not shown, causing a short circuit or overloading to be formed between, for example, terminal 150, where voltage B+ is developed, and the cold ground, the SMPS of FIGS. 1a and 1b begins operating in an intermittent mode. In the intermittent mode, each pulse of current $i_c$ is followed by a relatively long dead time interval in which no pulse of current $i_c$ occurs, as shown in FIG. 6. At the end of each current pulse of current $i_c$, the short circuit prevents voltage $V_{c1}$ from substantially exceeding voltage $V_{UR}$. Therefore, no ringing current will be produced in transformer T. Consequently, voltage $V_{W2}$ will not become positive, as in normal operation. Therefore, voltage $V_{W2}$ cannot initiate the conduction of transitor Q1.

In the beginning of a given dead time interval, transistor Q1 is maintained in cutoff by the negative voltage developed in capacitor 102. During the dead time interval, capacitor 102 is discharged slowly via a resistor 156, a diode 155, resistor 103 and winding W2 and produces current $i_B$ in a direction that is opposite to that shown by the arrow.

A resistor 101 is coupled between terminal 100a where voltage $V_{UR}$ is developed and the base of transistor Q1. When, as a result of the discharge of capacitor 102, current $i_B$, now flowing in the opposite direction to that of the arrow, becomes smaller than a current $i_{101}$ in resistor 101, transistor Q1 is turned on and the regenerative feedback loop produces a pulse of current $i_c$. Thus, current $i_{101}$ in resistor 101 causes the dead time interval to end.

At some point during the pulse of current $i_c$ that occurs in the short circuit, overloaded operation, current $i_B$ produced by voltage $V_{W2}$ becomes, during the conduction time of transistor Q1, insufficient for maintaining transistor Q1 in saturation. Therefore, the voltage at the collector transistor Q1 begins increasing and voltage $V_{W2}$ becomes less positive, causing current $i_B$ to decrease in the regenerative feedback loop manner. When current $i_B$ becomes zero, transistor Q1 turns off and the next dead time interval begins. Such intermittent operation is desirable when overloading occurs because it reduces the stress on transistor Q1 by protecting transistor Q1 from overheating.

Figure 7:
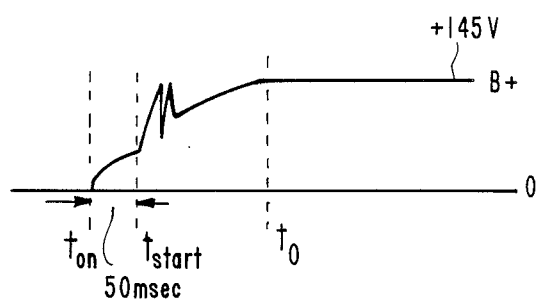
FIG. 7 illustrates a transient waveform useful for explaining the operation of the circuit of FIGS. 1a and 1b during start-up.

As explained before, during start-up operation, the SMPS of FIGS. 1a and 1b is initially overloaded by the deflection circuit, not shown. Therefore, the SMPS operates in the intermittent mode, that was explained before, as shown by the transient waveform of voltage B+ in FIG. 7 during interval $t_{on}-t_{start}$. Advantageously, the intermittent mode provides a soft start operation. At time $t_{start}$, transistor Q1 of FIG. 1a receives a proper base drive through winding W2 for operating the regenerative feedback loop. The result is that the intermittent mode operation ceases. At time $t_0$ of FIG. 7, the negative feedback loop is stabilized and operates in steady state and the soft start turn-on operation terminates.

In the embodiment of the invention discussed above, resistor 101 of FIG. 1a provides start-up base current for turning on transistor Q1. In a second modified embodiment of the invention, shown in FIG. 1a, a resistor 101' is coupled between a terminal 100b of bridge rectifier 100, where a half-wave rectified voltage $V_{100b}$ is produced, and between the base of transistor Q1. Resistor 101' is used instead of resistor 101 that is removed from the SMPS of FIG. 1a.

Figure 8:
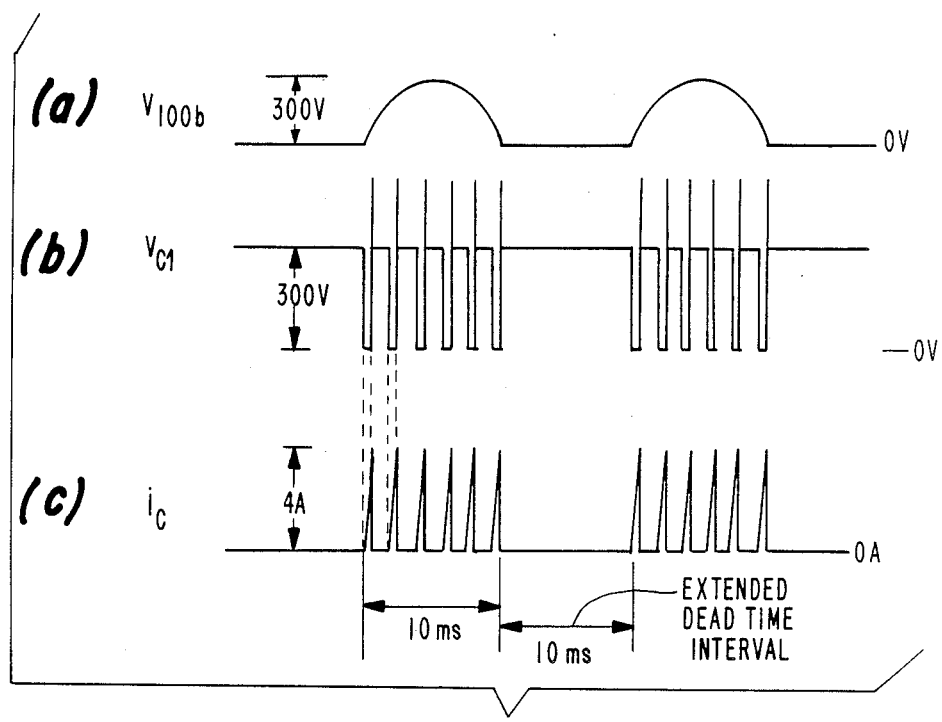
FIG. 8 illustrates waveforms of the circuit of FIGS. 1a and 1b, that incorporates a modification, under an overload condition.
Figure 9:
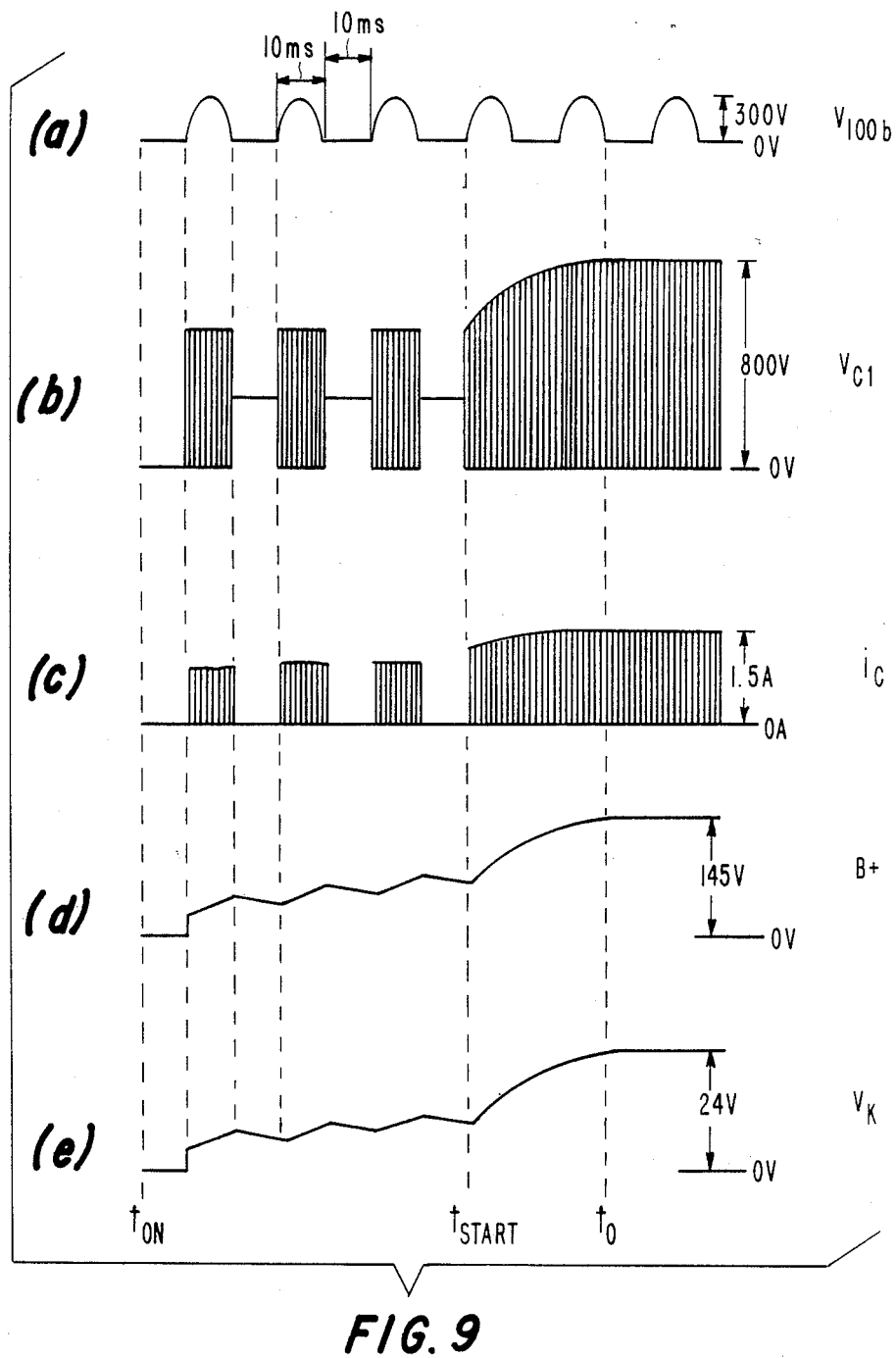
FIG. 9 illustrates waveforms of the circuit of FIGS. 1a and 1b, that incorporates a modification, during start-up.

During an overloading condition or during start-up, in the case when resistor 101' is used instead of resistor 101, substantially no current flows in resistor 101' during alternate half cycles of voltage $V_{AC}$. Each such half cycle has a length of 10 milliseconds that occurs when half wave rectified voltage $V_{100b}$ at terminal 100b is zero. Therefore, the dead time interval that was mentioned before extends throughout each alternately occuring 10 millisecond interval, as shown by the waveforms of voltage $V_{100b}$, voltage $V_{c1}$ and current $i_c$ in FIGS. 8a, 8b and 8c, respectively. The 10 millisecond extended dead time intervals of, for example, FIG. 8c enable cooling down of transistor Q1 of FIG. 1a that, advantageously, protects and reduces the stress on transistor Q1. The 10 millisecond dead time intervals may increase the length of an interval during which soft start operation occurs.

FIGS. 9a–9e illustrate waveforms useful for explaining the soft start operation of the SMPS of FIGS. 1a and 1b when resistor 101' is used instead of resistor 101. Similar symbols and numerals in FIGS. 1a and 1b, 2a–2m, 7, 8 and 9a–9e indicate similar items or functions. At time $t_{start}$ of FIG. 9c, current $i_c$ is sufficiently large for causing the one-shot arrangement to trigger that causes transistor Q1 of FIG. 1a to turn off during a portion of each cycle. The energy stored in transformer T during the conduction interval of transistor Q1 produces current $i_B$ that turns on transistor Q1 at the end of each nonconduction interval of transistor Q1.

What is claimed is:
1. A switch mode power supply, comprising:
 a source of an input supply voltage;
 a transformer having first and second windings;
 a controllable switch having a main current conducting terminal coupled to said first winding and to said source of said input supply voltage, said controllable switch being switched by a periodic first control signal for generating a first switching current in said first winding that stores magnetic energy in said transformer;
 means coupled to said transformer and responsive to said first switching current for producing from said stored energy an output supply voltage that is coupled to a load;
 a current sampling, first impedance coupled in a current path that includes said first winding for conducting at least a portion of said first switching current in said first impedance to develop in said first impedance a current sampling signal that is indicative of a level of said first switching current when said controllable switch is conductive;
 means responsive to said current sampling signal for generating said first control signal to switch said controllable switch into nonconduction when said first switching current exceeds a predetermined level;

means for applying a low impedance to said second winding after a first conduction interval of said controllable switch has elapsed, to cause said first switching current to exceed said predetermined level; and means for varying said first conduction interval in accordance with said output supply voltage such that a duty cycle of said controllable switch varies in a negative feedback manner for regulating said output supply voltage.

2. A power supply according to claim 1 wherein said first impedance, said controllable switch and said first winding are coupled in series.

3. A power supply according to claim 1 wherein said first impedance comprises a current sampling resistor.

4. A power supply according to claim 1 wherein said controllable switch comprises a first switching transistor and wherein a third winding of said transformer is coupled to a control terminal of said transistor to form a regenerative feedback loop that operates as a blocking oscillator.

5. A power supply according to claim 4 wherein said third winding is coupled to said control terminal of said transistor via a capacitor for developing in said capacitor a voltage that is coupled to said control terminal of said transistor for speeding up a turn-off transition in said transistor.

6. A power supply according to claim 5 further comprising means for generating a pulse in each period of said first control signal, and a second switching transistor having a control terminal where said pulse is developed for decoupling said third winding from said control terminal of said first switching transistor during said pulse such that said voltage that is developed in said capacitor causes said first switching transistor to turn off in preparation for the following period of conduction of said first switching transistor.

7. A power supply according to claim 6 wherein said pulse generating means comprises a one-shot arrangement.

8. A power supply according to claim 4 wherein an overloading condition of said transformer prevents the formation of said regenerative feedback loop and wherein said first control signal generating means comprises a source of a start-up current that is coupled to said control terminal of said first switching transistor to enable a restart-up operation of said switching transistor.

9. A power supply according to claim 8 wherein said voltage in said capacitor maintains said first switching transistor nonconductive for a substantially long interval when said overloading condition occurs to provide protection.

10. A power supply according to claim 8 wherein said start-up current is generated at alternately occuring intervals that occur at a frequency that is in accordance with a frequency of an AC main voltage.

11. A power supply according to claim 1 wherein said first winding is electrically nonisolated from said controllable switch with respect to an electrical shock hazard and wherein said second winding is electrically isolated by said transformer from said controllable switch.

12. A power supply according to claim 11 wherein said first winding is electrically nonisolated from said supply voltage.

13. A power supply according to claim 11 wherein said transformer forms an isolation barrier for coupling said first switching current across said isolation barrier in one direction to develop said output supply voltage, and for coupling a second control signal across said isolation barrier in the opposite direction to said impedance.

14. A power supply according to claim 1 further comprising a third winding of said transformer coupled via a capacitance to a control terminal of said controllable switch to form loop that operates during normal operation as a blocking oscillator.

15. A power supply according to claim 1 wherein said controllable switch comprises a first switching transistor and wherein said low impedance applying means comprises means responsive to a signal- that is developed in said transformer and to a signal that is representative of said output supply voltage for generating a second control signal that is coupled to a control terminal of a second switching transistor, said second switching transistor applying said low impedance across said second winding of said transformer at a controllable instant within a given period of said first control signal that varies in accordance with a level of said output supply voltage, said low impedance producing an increase in a rate of change of said first switching current in said first winding that is substantially higher than prior to said controllable instant.

16. A power supply according to claim 15 wherein said second switching transistor applies said low impedance when said second switching transistor is turned on.

17. A power supply according to claim 15 wherein said first control signal generating means comprises a first comparator responsive to said first switching current and to a first reference level for generating a pulse of said first control signal when said first switching current becomes larger than a value determined by said reference level such that a peak level of said first switching current is determined in accordance with said reference level.

18. A power supply according to claim 17 further comprising a source of an on/off control signal that is coupled to said load and that causes a reduction in an output current flowing in said load during a standby mode of operation such that the reduction in said output current initially causes said output supply voltage to increase after a transition of said on/off control signal from a power-on state to a power-off state thereof occurs, and a second comparator responsive to a voltage that is representative of said output supply voltage and to a second reference level for producing, after said transition occurs, a third control signal when said output supply voltage becomes larger than a level determined in accordance with said second reference level, said third control signal being coupled to said first comparator for varying said first reference level that causes said peak level of said first switching current to become substantially smaller than during normal operation.

19. A power supply according to claim 1 wherein said first impedance comprises a current sampling resistance that is coupled in series with said controllable switch and wherein said first control signal generating means comprises a comparator responsive to a signal that is developed in said current sampling resistor and to a reference level for generating a trigger signal, and a one-shot arrangement responsive to said trigger signal for generating a pulse of said first control signal when said signal that is developed in said current sampling resistance becomes equal to said reference level, said pulse being coupled to said control terminal of said controllable switch for turning off said controllable switch throughout the duration of said pulse such that outside the duration of said pulse said controllable switch is conductive.

20. A power supply according to claim 19 wherein said pulse of said first control signal has a length that is the same in each cycle.

21. A power supply according to claim 1 wherein said low impedance applying means comprises a sawtooth generator responsive to said output supply voltage for producing a sawtooth signal having a first ramping portion with a rate of change that varies in accordance with said output supply voltage and a comparator responsive to said sawtooth signal and to a reference level for generating a second control signal when said sawtooth signal is at a level that is determined in accordance with said reference level such that said duty cycle of said controllable switch varies in accordance with said output supply voltage in a negative feedback manner that regulates said output supply voltage.

22. A power supply according to claim 21 wherein said sawtooth generator is responsive to a signal that is produced in said transformer for synchronizing said first ramping portion to a timing of said controllable switch and wherein a second ramping portion of said sawtooth signal that changes in an opposite manner to that of said first ramping portion occurs after said controllable switch becomes nonconductive.

23. A switch mode power supply, comprising:
a switching transistor;
a transformer having a first winding that is coupled to a main current conducting electrode of said switching transistor;
control means coupled to a control electrode of said switching transistor for producing a switching operation therein;
means coupled to said transformer for producing, in accordance with said switching operation an output supply voltage that is applied to a load and an output current that is coupled to said load to produce a load current therein;
means responsive to said output supply voltage for generating a first control signal that is coupled to said control means for varying a duty cycle of said switching transistor in accordance with said output supply voltage during a normal mode of operation;
a source of an on/off control signal that is coupled to said load that reduces said load current in said load during a standby mode of power supply operation relative to said load current during said normal mode, thereby causing said output supply voltage to increase after said on/off control signal changes from a power-on state to a power-off state;
means responsive to said output supply voltage for generating a second control signal when said output supply voltage becomes greater than a predetermined level that is indicative of a transition to said standby mode of operation, said second control signal being coupled to said first control signal generating means for varying said first control signal during said standby mode to maintain a peak level of a first switching current that flows in said switching transistor substantially below its level during said normal mode for decreasing said output supply voltage to a value smaller than during normal mode of operation; and
means for maintaining the generation of said second control signal during said standby mode of operation when said supply voltage has decreased to said smaller value.

24. A power supply according to claim 23 wherein said second control signal generation maintaining means comprises a latching arrangement that utilizes positive feedback.

25. A power supply according to claim 23 wherein said transformer includes a second winding that is coupled to said control electrode of said transistor to form a regenerative feedback loop that operates as a blocking oscillator.

26. A switch mode power supply, comprising:
a source of an input supply voltage;
means for generating a periodic first control signal;
a transformer having first and second windings;
first switching means responsive to a switching signal and coupled to said first winding for generating a first switching current in said first winding that is transformer coupled to said second winding to energize said second winding during a first portion of a given period of said switching signal;
second switching means responsive to an input signal and coupled to said second winding for periodically applying a low impedance across said energized second winding, said applied low impedance causing, by a transformer action, a substantial increase in said first switching current when said low impedance is applied;
means responsive to said first switching current and coupled to said first control signal generating means for sensing said increase in said first switching current to control a timing of said first control signal when said increase in said first switching current occurs, in accordance with said input signal; and
means responsive to said first control signal and coupled to said input supply voltage for generating from said input supply voltage an output supply voltage, in accordance with said first control signal.

* * * * *

UNITED STATES PATENT AND TRADEMARK OFFICE
CERTIFICATE OF CORRECTION

PATENT NO. : 4,930,060

DATED : May 29, 1990

INVENTOR(S) : GIOVANNI M. LEONARDI

It is certified that error appears in the above-identified patent and that said Letters Patent is hereby corrected as shown below:

Drawing Sheet, consisting of FIG. 1b, is missing from patent, should be added as shown on the attached sheet.

On title page, under "Foreign Application Priority Data"
"Oct. 3, 1988" should be -- March 10, 1988 --.

Col. 5, line 5, "$2f$" should be -- $2f$ --

Col. 5, line 41, "$V_{cf}$" should be -- $V_{c1}$ --

Col. 5, line 50, "       "       "       "

Col. 5, line 53, "       "       "       "

Col. 12, line 14, after "form" insert -- a regenerative --.

Signed and Sealed this

Third Day of March, 1992

Attest:

HARRY F. MANBECK, JR.

*Attesting Officer*     *Commissioner of Patents and Trademarks*